3,840,684
DECAFFEINATED COFFEE

Thomas L. Fazzina, Port Chester, N.Y., Gary V. Jones, Ramsey, N.J., and Richard P. Scelia, Harrison, N.Y., assignors to General Foods Corporation, White Plains, N.Y.
No Drawing. Filed Mar. 13, 1970, Ser. No. 19,489
Int. Cl. A23f 1/00
U.S. Cl. 426—193          10 Claims

ABSTRACT OF THE DISCLOSURE

Superior flavored decaffeinated coffees are produced by separately solvent decaffeinating a "high grade" coffee and separately water decaffeinating a "low grade" coffee and then blending the separately decaffeinated coffees together. The coffee may be separately roasted and ground before blending.

BACKGROUND OF THE INVENTION

This invention relates to new and improved processes for blending decaffeinated coffee blends which, upon percolation, produce superior tasting coffee brews. More particularly, the invention is concerned with combining blends of "high grade" coffee which have been solvent decaffeinated and blends of cheap "low grade" coffee which have been water decaffeinated in proportions which, when percolated, provide coffee brews having taste superior to either the solvent or water decaffeinated beans percolated alone.

In general, what is meant by "high grade" coffee is the more expensive coffees such as Santos and Milds which are of the Arabica variety, with the Santos coffees being relatively non-aromatic or neutral flavored in the coffee group, while the Mild coffees are very fragrant and acidy when they are of the high-grown type and somewhat thinner in aroma and body when of the "low-grown" type. On the other hand, what is meant by "low grade" coffee is the cheaper or relatively inexpensive coffee such as Robusta, which is botanically classified as of the canephora variety, and is generally considered as having poor flavor characteristics.

The art establishes that whole green coffee beans have heretofore been extracted with aqueous solutions containing non-caffein green coffee solubles in amounts in equilibrium concentrations with the coffee solubles in solution in the beans, to provide upon roasting, grinding and percolation, coffee substantially free of caffein. The cup flavors of beans produced according to water decaffeination processes are generally characterized as having good body and low aromatics.

Still further, the art also recognizes that caffein has been extracted from green coffee beans with a large variety or organic solvents, to produce upon roasting, grinding, and percolation, coffee substantially free of caffein. Cup flavors of beans produced according to these methods are commonly described as having good aromatics, sourness and acidity, but little body, and characterized as having a sweet taste.

While considerable dispute exists regarding the taste advantages of water decaffeinated coffee brews versus solvent decaffeinated brews and vice-versa, a community of agreement exists as to the characteristic taste disadvantages of brews formed from both decaffeination processes. It is believed that these decaffeination aftermath taste disadvantages are due to the preferential solubility of some green coffee solubles (i.e. waxes and oils) for various organic solvents over water, when utilizing the solvent processes, and the preferential solubility of some green coffee solubles for water over organic solvents when employing the aqueous process.

The principal object of the invention is to provide superior tasting decaffeinated coffee brews having none of the disadvantageous taste characteristics of coffee brews prepared solely from either solvent decaffeinated or water decaffeinated green coffee beans after roasting.

A further object of the invention is to provide optimum roast colors and grind distributions for each group of coffee being separately decaffeinated.

Other objects of the invention will become apparent in the description and examples hereinafter appearing.

SUMMARY OF THE INVENTION

It has now been discovered that by separately decaffeinating a "high grade" coffee via solvent and separately decaffeinating a "low grade" coffee via water (green coffee extract) and then blending the decaffeinated coffees, preferably after separate roasting and grinding that a superior brew of coffee can be obtained.

This is accomplished by employing gentle caffein extracting materials (i.e. organic solvents) at lower temperature on "high grade" coffees, such as Milds or Santos, to maximize the preservation of their advantageous flavor characteristics in the brew. While on the "low grade" coffees, such as Robusta, the use of water at high temperatures is effective as a harsher decaffeination extraction means, which collaterally also changes and/or removes considerable amounts of non-caffein materials associated with disadvantageous flavor characteristics.

The invention eliminates the disadvantageous taste characteristics associated with coffee brews obtained exclusively from solvent decaffeinated coffee beans, as well as coffee beans which have been extracted of caffein by aqueous means.

DETAILED DESCRIPTION OF THE INVENTION

It has been found that on a scale ranging from poorest to best, the taste characteristics of non-decaffeinated and variously decaffeinated "high grade" blends composed of about 30% Milds and 70% Santos was in the vicinity of the best end of the scale; whereas the taste characteristics of "low grade" non-decaffeinated and variously decaffeinated coffee which is primarily Robusta was in the vicinity of the poorest end of the scale as follows:

| | Taste |
|---|---|
| IA Non-decaffeinated "high grade" | Best. |
| IB Solvent decaffeinated "high grade" | Good. |
| IC Water decaffeinated "high grade" | Acceptable. |
| IIA Water decaffeinated "low grade" | Poor. |
| IIB Solvent decaffeinated "low grade" | Poorer. |
| IIC Non-decaffeinated "low grade" | Poorest. |

In most instances, commercial considerations necessitate marketing blends of decaffeinated "high" and "low" grade coffees which have produced flavors between the extremes set forth above. Typical of such blends, of "high" and "low" grade coffees are both the solvent and water decaffeinated blends of Milds/Santos/Robusta. However, it has been found that the taste of these blends are inferior to blends of Milds/Santos/Robusta wherein the Milds/Santos portion has been solvent extracted of caffein and the Robusta portion has been water extracted of caffein.

In the equeous or water extraction, whole beans are extracted with an aqueous liquid solution of green coffee solids. The aqueous extract is then contacted with solvent to remove the caffein and the resulting caffein-free extract is recycled to the bean extractors. After drying, roasting and grinding, the extracted beans can be packed as roasted and ground decaffeinated coffee or percolated, dried, and packed as soluble decaffeinated coffee.

In the solvent decaffeination process, the green coffee beans are moisturized for 2–2½ hours to obtain increased moisture (as determined by the degree of swell). The beans are then decaffeinated by the addition of 10 to 14 batches of an organic solvent, i.e. methylene chloride. After decaffeination, the solvent is pumped out and the solvent residue is removed from the beans by steam stripping. After steam stripping, the coffee beans are dried for ultimate use as soluble and ground decaffeinated coffees.

Since the advantageous taste characteristics of decaffeinated coffee is generally considered to be good body, relatively high aromatics, low acidity and mild sweet taste, in addition to determining proper blends of solvent and water decaffeinated beans to obtain the foregoing favorable qualities, it has become necessary to determine the corollary roast colors necessary to coincide with these favorable effects. For example, darker roast colors are associated with more body whereas lighter roast colors are associated with more aromatics.

"Roast color" means the roast color normally understood in this art and is represented by a visual color in the roasted bean and the percentage of solids lost during roasting. A "light roast" is typically a cinnamon colored roast, just within the palatable range with about a 12% weight loss on roasting. A "dark roast" is one which is dark brown with tinges of black and has about a 16% loss during roasting (this represents the darkest roast usually used in the United States). In the foregoing roast color description, it assumed that the green coffee contains about 10% free water moisture and the actual solids loss can be obtained by simply deducting the 10% free water.

In general the "high grade" coffees which have been solvent decaffeinated can be further improved in flavor by roasting these coffees to a darker roast color than the "low grade" coffee which has been water decaffeinated. It appears that by under-roasting the "low grade" coffee such as water decaffeinated Robusta a minimum of bad flavor is developed during the roasting process while on the other hand by roasting the solvent decaffeinated "high grade" coffee to a dark roast all of the desirable flavor notes are enhanced and brought out. In other words, separate roasting of the "high grade" coffee and the "low grade" coffee under controlled conditions provides another improvement in the ultimate flavor obtained. Most preferably, separate roasting of the coffee beans to bring out the best flavor in the "high grade" coffees and to minimize the bad flavor effects of the "low grade" coffee can be further enhanced or improved by separate grinding of the two different types of coffees following the roasting step. This is usually accomplished by grinding the darker roasted "high grade" coffees to a fine particle size distribution, and the lighter roasted "low grade" coffee is ground to a coarser or larger particle size distribution. In any event, it is understood by the skilled worker in this art that an unexpected improvement in flavor can be obtained by the simple combination of the above steps namely solvent decaffeinating at least 20% or more of the "high grade" coffee while water decaffeinating 30% or more of the "low grade" coffee and then simply roasting the "high grade" coffee to a darker color compared to the "low grade" coffee, followed by grinding the "high grade" coffee to a smaller size than the "low grade" coffee. If the simple conditions are observed and followed an unexpected improvement in flavor will be obtained.

The following examples will more specifically set forth the preferred embodiments of the invention.

EXAMPLE I (A) A blend of 15% Milds, 35% Santos and 50% Robusta green coffee beans were water decaffeinated according to the process of U.S. Pat. #2,309,092. The blend was then roasted in 500 pound lots at 390° F. to 410° F. for 10–12 minutes, and allowed to cool to ambient temperature and ground. This decaffeinated roasted and ground coffee when percolated in a stove top coffee brewer under control conditions gave a cup flavor of 5, based on a scale of 1–10 (1 representing the poorest taste and 10 representing the best taste).

(B) A blend of 15% Milds, 35% Santos and 50% Robusta green coffee beans were solvent decaffeinated according to the processes of U.S. Pats. Nos. 1,977,416 and 2,381,965, employing dichloromethane as the solvent. The blend is roasted as in (A), ground, and allowed to cool to ambient temperature. A brew is then prepared according to (A) but having a cup flavor of 7 based on a scale of 1–10.

(C) In this part of the example the 50% Robusta (low grade coffee) was separately water decaffeinated as in (A) and the "high grade" coffee comprised of 15% Milds and 35% Santos was solvent decaffeinated as in (B). The decaffeinated coffee was then blended, roasted and ground as in (A) and (B). The brew prepared according to this procedure had a taste advantage over both the water decaffeinated control A and the solvent decaffeinated control B, as evidenced by a taste score of 8.

EXAMPLE II (A) Same as (A) in Example I using 6% Milds, 14% Santos and 80% Robusta. Upon roasting, grinding and percolation as in Example I, a cup flavor of 4 was obtained.

(B) Same as (B) in Example I using 6% Milds, 14% Santos and 80% Robusta; but the brew prepared had a cup flavor of 6 based on a scale of 1–10.

(C) Same as (C) in Example I using 6% Milds, 14% Santos and 80% Robusta. The brew prepared according to this procedure had a taste advantage over both the water decaffeinated control (A) and the solvent decaffeinated control (B), as evidenced by a taste of score of 7.

EXAMPLE III

Same as in Examples I (C) and II (C) except that the solvent decaffeinated coffee is extracted with water to give a coffee extract which is frozen and then, freeze-dried and the water (containing green coffee solubles) decaffeinated coffee is extracted with water to give a coffee extract which is spray dried. The cup flavors produced were comparable to those of (C) in Examples I and II.

EXAMPLE IV

Same as in Examples I and II except that the "low grade" water decaffeinated coffee and the "high grade" solvent decaffeinated coffee was separately roasted to produce a darker roast color and concomitant flavor improvement in the "high grade" blend. The separate roasts were combined, ground and percolated to give improved cup flavors over those of (C) in Examples I and II.

EXAMPLE V

Same as in Example IV except that after separate roasting, the "low grade" coffee was coarse ground to at least 75% +30 mesh (U.S. Standard Sieve), i.e. at least 3% +14 mesh, at least 50% +20 mesh, 20% to 30% +30 mesh, and less than 20% minus 60; and the "high grade" coffee was fine ground to a size smaller than the "low grade," i.e. less than 3% +14 mesh, less than 50% +20 mesh, 15% to 25% +30 mesh and at least 25% minus 60 mesh. The differently ground coffees were combined and percolated to produce improved cup flavor over those of Example IV.

While it is evident that advantages can be obtained by separate decaffeination of "high grade" coffees which are then combined with separately decaffeinated "low grade" coffees at different levels, it is understood that a flavor improvement of a "low grade" of coffee is not obtained until at least 20% of the "high grade" coffee is used in combination with at least 30% of the "low grade" coffee, which "low grade" must be water decaffeinated to upgrade its flavor.

It is to be noted that while the Examples demonstrate the use of Robusta as the "low grade" coffee, the benefits of the invention may nonetheless be realized where minor proportions of the "low grade" coffee faction are in fact "high grade" coffees such as Milds and Santos.

The benefits of the invention will also be detectable when blending water decaffeinated Robusta coffee with non-decaffeinated "high grade" coffee.

What is claimed is:

1. A blend of "high grade" and "low grade" roasted and ground decaffeinated coffee having improved flavor consisting essentially of at least 20% "high grade" coffee which has been organic solvent decaffeinated, and at least 30% "low grade" coffee which has been water decaffeinated.

2. The blend of Claim 1 wherein the "high grade" coffee has darker roast color than "low grade" coffee.

3. The blend of Claim 1 wherein the "high grade" coffee has a darker roast color than the "low grade" coffee and a finer grind size distribution than the "low grade" coffee.

4. The blend of Claim 1 wherein all of the "high grade" coffee has been solvent decaffeinated and wherein all of the "low grade" coffee has been water decaffeinated, said "high grade" coffee beans are darker in roast color and finer in grind size distribution than the "low grade" coffee.

5. A process for producing an improved blend of "high grade" and "low grade" decaffeinated coffee which comprises:
   organic solvent decaffeinating "high grade" green coffee beans,
   water decaffeinating "low grade" green coffee beans,
   roasting the green coffee beans,
   grinding the roasted coffee beans and
   blending the coffee at some point after decaffeination to produce a blend of at least 20% solvent decaffeinated "high grade" coffee and at least 30% water decaffeinated "low grade" coffee.

6. The process of Claim 5 wherein the solvent decaffeinated coffee is separately roasted to a darker color than the separately roasted water decaffeinated coffee prior to blending.

7. The process of Claim 6 wherein the solvent decaffeinated coffee is roasted to a darker color and finer ground than water decaffeinated coffee prior to blending.

8. The process of Claim 5 wherein the solvent decaffeinated coffee is extracted with water to give a coffee extract, said extract is then spray-dried and wherein the water decaffeinated coffee is extracted with water to give a coffee extract, and said extract is dried by spray-drying.

9. The process of Claim 5 wherein the solvent decaffeinated coffee is extracted with water to give a coffee extract, said extract is frozen and then freeze-dried and wherein the water decaffeinated coffee is extracted with water to give a coffee extract, and said extract is frozen and freeze-dried.

10. The process of Claim 5 wherein the solvent decaffeinated coffee is extracted with water to give a coffee extract, said extract is frozen and then freeze-dried and wherein the water decaffeinated coffee is extracted with water to give a coffee extract and said extract is dried by spray-drying.

References Cited

UNITED STATES PATENTS

| | | | |
|---|---|---|---|
| 1,977,416 | 10/1934 | Wilder | 99—70 |
| 2,309,092 | 1/1943 | Berry et al. | 99—70 |
| 2,863,774 | 12/1958 | Bonnotto | 99—71 |
| 3,493,389 | 2/1970 | Hair et al. | 99—71 |
| 3,544,331 | 12/1970 | Hair | 99—68 |

OTHER REFERENCES

Sivetz, *Coffee Processing Technology*, vol. 2 (1963), pp. 208–214.

FRANK W. LUTTER, Primary Examiner

N. F. GREENBLUM, Assistant Examiner

U.S. Cl. X.R.

426—388, 427, 428